(12) United States Patent
Oshima et al.

(10) Patent No.: US 6,313,930 B1
(45) Date of Patent: *Nov. 6, 2001

(54) OPTICAL IMAGE READING DEVICE

(75) Inventors: Masaki Oshima, Kofu; Hiroaki Fujihara, Yamanashi; Hayato Ichinose, Yamanashi; Kyoji Tachikawa, Yamanashi, all of (JP)

(73) Assignee: Nisca Corporation, Yamanashi-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/927,840

(22) Filed: Sep. 11, 1997

(30) Foreign Application Priority Data

Sep. 11, 1996 (JP) .................................... 8-263627

(51) Int. Cl.⁷ ...................................... H04N 1/04
(52) U.S. Cl. .......................................... 358/498; 358/496
(58) Field of Search .................................. 358/498, 496, 358/474, 505; 382/312, 321, 135; 271/109, 4.1, 10.11, 121, 3.2, 3.14, 250, 251, 264, 275

(56) References Cited

U.S. PATENT DOCUMENTS

| | | | |
|---|---|---|---|
| 4,257,587 | * | 3/1981 | Smith .................................. 271/236 |
| 4,396,902 | * | 8/1983 | Warthan et al. ......................... 382/64 |
| 5,112,037 | * | 5/1992 | Holbrook ................................. 271/2 |
| 5,460,362 | * | 10/1995 | Fassman et al. ....................... 271/264 |
| 5,517,577 | * | 5/1996 | Wagner ................................. 382/135 |
| 5,768,448 | * | 6/1998 | Ichinose ............................... 382/312 |
| 5,969,831 | * | 10/1999 | Ichinose . |

FOREIGN PATENT DOCUMENTS 1108659   7/1989   (JP) .
3235470  10/1991   (JP) .

* cited by examiner

*Primary Examiner*—Cheukfan Lee
(74) *Attorney, Agent, or Firm*—Pitney, Hardin, Kipp & Szuch LLP

(57) ABSTRACT

A document passage in an image reading device, which is defined between an upper frame having means for transporting a given document and a base frame having a document setting surface and means for optically reading an image on the given document, is open at its one side by supporting the upper frame above the base frame in a cantilever state, so that the document of any size such as a name card and envelope can be dealt with to be subjected to image processing regardless of the size of the document. The document transporting means brings about a laterally urging force to be imparted to the document being forwarded on the document setting surface, so that the document can be stably forwarded without causing wobbling widthwise, thus effecting automatic document feeding and image reading with a high accuracy.

16 Claims, 7 Drawing Sheets

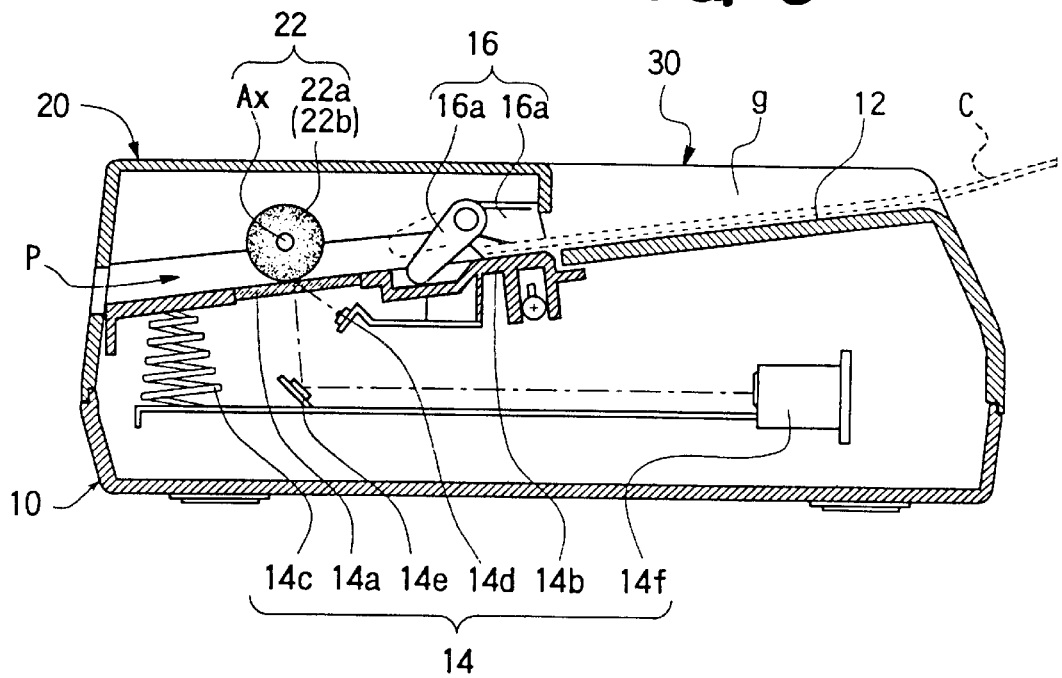
F I G. 3
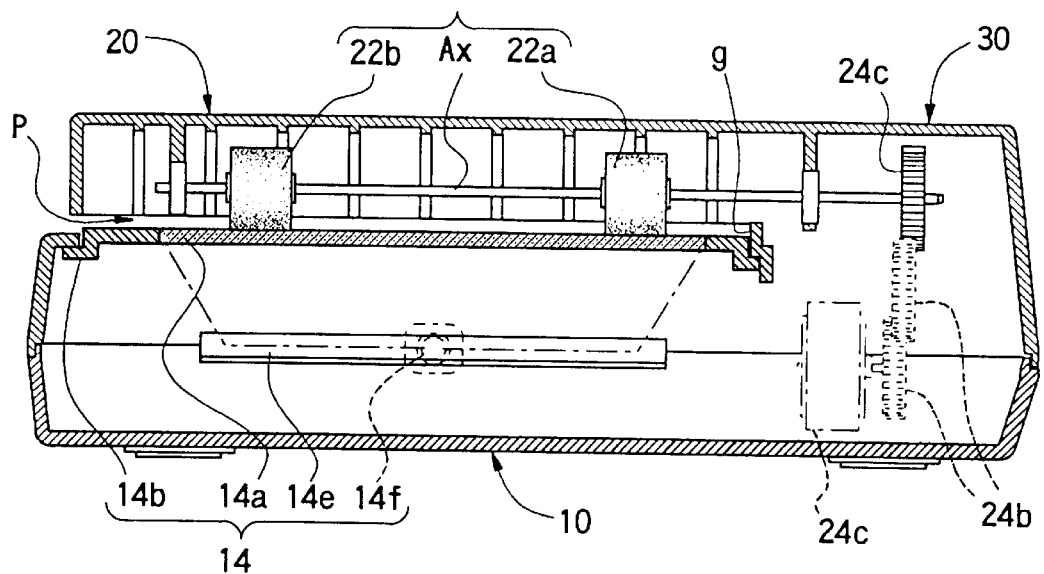
F I G. 4

OPTICAL IMAGE READING DEVICE

BACKGROUND OF THE INVENTION

1. Field of the Invention

This invention relates to a device for optically reading images such as characters and patterns on card-like documents, and more particularly to an optical image reading device provided with a mechanism capable of stably transporting a given document in a proper forwarding direction regardless of the size of the document, so as to reliably read the image on the given document with a high accuracy.

2. Description of the Prior Art

Image reading devices such as an image scanner and a card reader for optically reading images including characters and/or patterns on documents of various kinds such as a name card, plastic card, post card and envelope and converting image information thus read into electric signal data. Generally, the image reading device of this sort is provided with optical image reading means for optically scanning the image surface of a given document to obtain the corresponding image information, and a mechanism for transporting the document to scan the document with the optical image reading means. In order to automatically feed the document, the image reading device further calls for means for guiding the document, and means for moving the document along the guiding means toward the image reading position at a constant speed.

In the case where a demand is felt for the greater accuracy in performing an optical character reading (OCR) or other specific image processing, the document must be moved at a constant speed in the forwarding direction (sub-scanning direction) and stabilized in the width direction (main scanning direction). Namely, because the resolution and image reading accuracy of the device depend upon the performance of transporting the document, high stability in transporting the document is required.

For example, Japanese Patent Application Public Disclosure No. HEI 3-235470 discloses an image inputting device having a document feeder for forwarding a document along an image reading portion. The image reading portion of this conventional document feeder is formed in the shape of a tunnel having an entrance opening and an exit opening, through which the document is moved along one guide rib disposed on one side of a document passage. That is to say, the document is pushed by hand toward the guide rib when being forwarded to the tunnel-like image reading portion to be subjected to image reading. Since the tunnel-like image reading portion is closed on its both sides, the document having a width equal to the inner width of the image reading portion may be stably forwarded along the image reading portion without wobbling widthwise (in the main scanning direction) as guided by the both sides thereof. Whereas, when the document to be forwarded through the tunnel-like image reading portion is smaller in width than the image reading portion, the document cannot be forwarded stably. It is a matter of course that the document feeder having the tunnel-like image reading portion cannot deal with the document larger than the width of the image reading portion, otherwise it should be increased in size so as to enable handling of the large document.

In Japanese Utility Model Appln. Public Disclosure No. HEI 1-108659, there is disclosed another image reading device having a document passage which is open on one side thereof so that a document of large size can be dealt with. Namely, the document passage is encompassed by a casing formed in the shape of a generally square bracket ([) having an opening on its one side, so that even a large document can be passed therethrough. However, it is possible for the image reading device having the square bracket-shaped casing to stably deal with the document of small size as is similarly experienced in the aforesaid tunnel-like image reading portion, because the document passing through the image reading device is not positively held. The document advancing freely along the document passage will irregularly wobble widthwise, resulting in decrease in reading accuracy.

Accordingly, the document has to be practically held with finger tips pressed lightly toward an innermost guide surface, which is one of walls defining the document passage, when being sent through the image reading device having the one side opening. The work of manually sending the document along the document passage requires habituation to move the document accurately at a constant speed, but it is either impossible or very difficult. Besides, the conventional device having the one side opening cannot assure stability of transporting a document which is smaller in width than the document passage and difficult to hold by hand in passing through the document passage.

It goes without saying that use of a high-performance controlling system may make it possible to transport and optically scan a document of any size with a high accuracy, but disadvantageously, such a device inevitably turns out to be expensive and susceptible to mechanical trouble during service and cannot be used practically.

OBJECT OF THE INVENTION

An object of the present invention is to provide an optical image reading device capable of automatically transporting a document with notably high stability regardless of the size of the document, thus to optically read an image on the document with a high accuracy.

Another object of the invention is to provide an optical image reading device capable perfectly preventing the document during transporting from wobbling in the width direction of the document.

Still another object of the invention is to provide an optical image reading device made simple in structure and compact, having a stable function of automatically transporting and optically reading even a large document with ease.

SUMMARY OF THE INVENTION

To attain the objects described above according to the present invention, there is provided an optical image reading device comprising a base frame including image reading means and a document setting surface with a document guide surface, and an upper frame having means for transporting a document while laterally urging the document advancing along the document setting surface toward the document guide surface. The upper frame is supported above the aforenoted document setting surface of the base frame astride a document passage in a cantilever state.

The aforementioned document guide surface defining the direction in which the document is forwarded is formed by a vertical wall surface of a side frame, which rises perpendicularly from the document setting surface. The document transporting means brings about a laterally urging force exerted to the document being forwarded in the forwarding direction along the document guide surface. Consequently, the document is urged toward the document guide surface with the laterally urging force during being forwarded, so as to be stably moved without wobbling widthwise nor causing dislocation.

The document transporting means may be formed of one or more rotating rollers. To cause the rotating rollers to produce the laterally urging force, a rotating shaft supporting the rotating rollers of the document transporting means may be inclined relative to the direction perpendicular to the document guide surface, or the rotating rollers may be made different in diameter. In the case where the document transporting means employs a single rotating roller, the rotating roller may be formed in a truncated conical shape.

Other objects and features of the present invention will be hereinafter explained in detail with reference to the accompanying drawings.

BRIEF DESCRIPTION OF THE DRAWINGS

FIG. 3 is a side section schematically showing the device of FIG. 1.

FIG. 4 is a front section schematically showing the device of FIG. 1.

DESCRIPTION OF THE PREFERRED EMBODIMENTS

The optical image reading device according to this invention is generally of a type which is called "image scanner" or "card reader" for optically reading images on a card-like document such as a name card, but the invention is not specifically limited only to these known devices. The essentials of the invention are applicable to image processing systems of various types such as a copying machine, facsimile, automatic letter-sorting system, and identification-card recognition system, which are necessarily provided with means for transporting the document defined in the broad sense in one direction at a constant speed.

Figure 1:
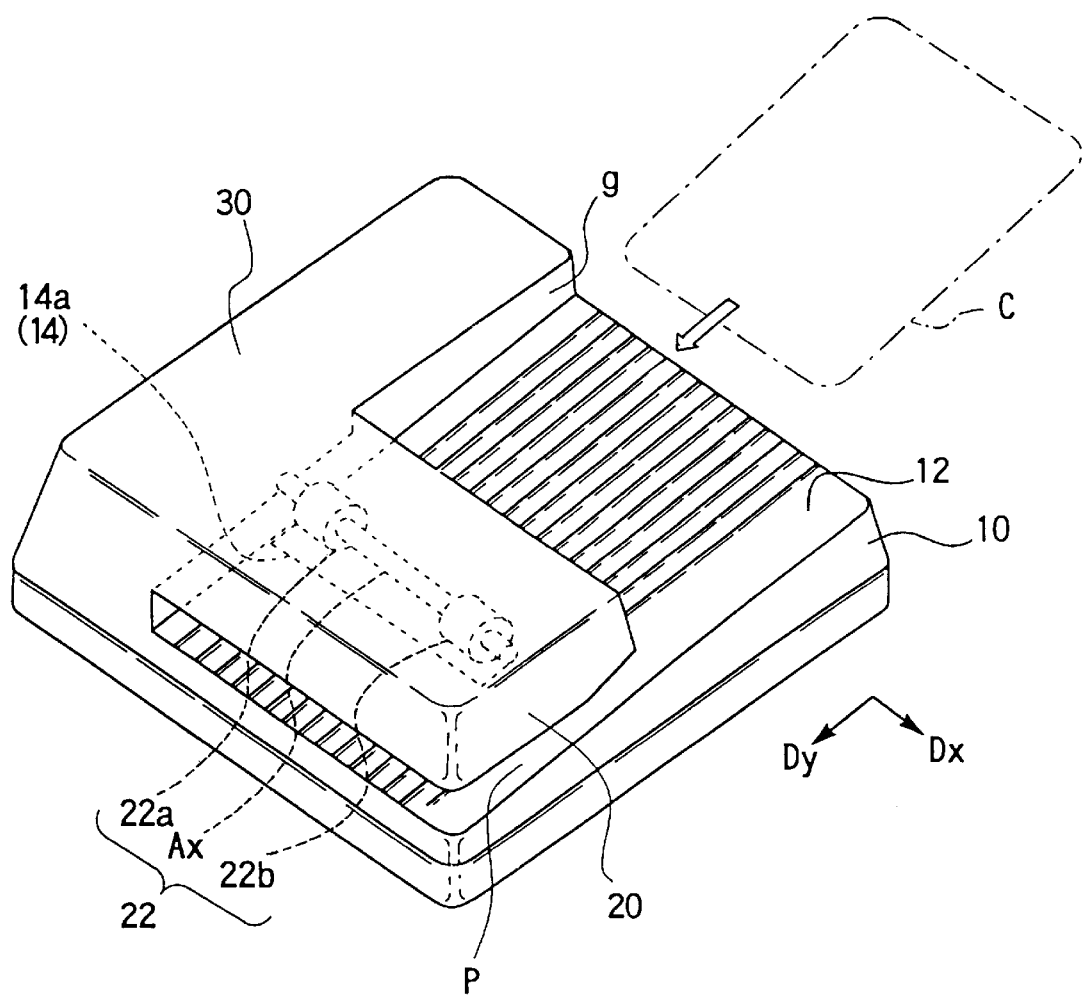
FIG. 1 is a perspective view showing one embodiment of an optical image reading device according to this invention.

In the first embodiment of the invention shown in FIG. 1 by way of example, the reading device of the invention is presumed to be applied to a portable system for optically reading images such as characters and patterns printed on a card-like document such as a name card and postcard.

Figure 2:
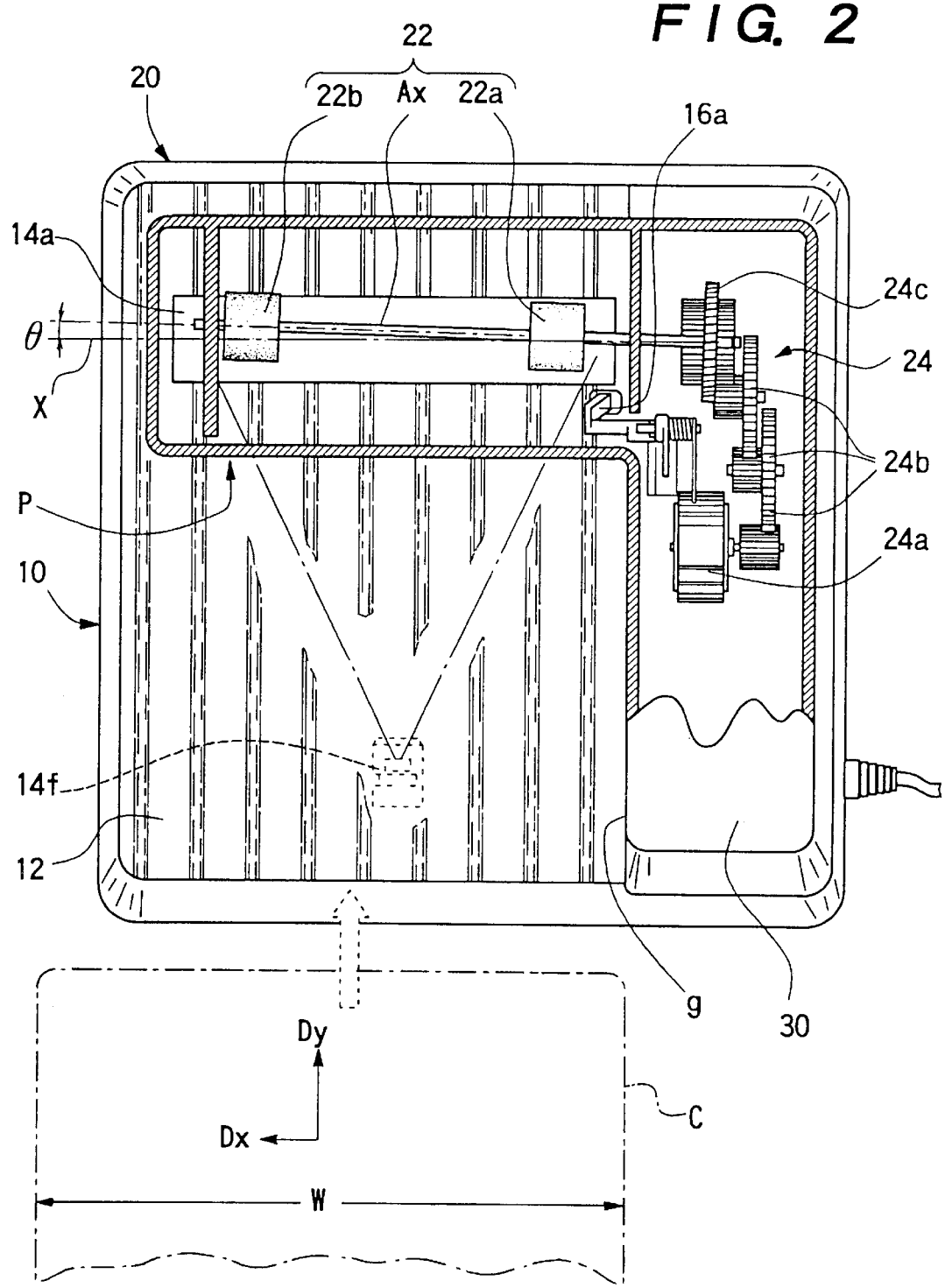
FIG. 2 is a partial cutaway plane view schematically showing the device of FIG. 1.

The reading device in the illustrated embodiment comprises a base frame 10 having a document setting surface 12 on which a document C is placed, an upper frame 20 horizontally disposed above the base frame 10 astride a document passage P, and a side frame 30 for supporting the upper frame 20 above the base frame 10. The whole configuration of the base frame 10, upper frame 20 and side frame 30 is shaped in a substantially square bracket ([) like a cantilever. Thus, the document passage P formed on the document setting surface is open at its one side (left side in FIG. 2).

On the document setting surface 12 on the base frame 10, there are defined a document forwarding direction (sub-scanning direction) Dy, and a document guide surface g for guiding the document C being forwarded in the document forwarding direction Dy. The document guide surface g is formed by a wall surface of the side frame 30, which perpendicularly rises from the document setting surface 12 of the base frame 10.

The document setting surface 12 on which the document is set slopes down in the document forwarding direction Dy. Since the document passage P defined on the document setting surface is open at its one side as noted above, the document C of any size from a small-sized name card to a large-sized postcard or envelope can be dealt with regardless of the size of the document.

Adjacent to the document setting surface 12 on the downstream side relative to the document forwarding direction Dy, image reading means 14 and document detecting means 16 are disposed.

The image reading means 14 in the illustrated embodiment comprises a transparent platen 14a flush with the document setting surface 12, which is located at a document reading position X, a holder 14b for supporting the platen 14a, a spring 14c for urging the holder 14b upward, a light source 14d for illuminating the document passing through the document reading position X on the platen 14a, reflecting means 14e for refracting the image light reflected from the document illuminated by the light source, and a photo-electric conversion means 14f for converting the image light traveling from the document through the reflecting means 14e into electric signal data.

The document reading position X at which the platen 14a is placed is defined by a linear region extending in the main scanning direction (width direction of the document) Dx perpendicular to the sub-scanning direction, i.e. the direction Dy in which the document C is forwarded. That is to say, the desired optical image reading is carried out by optically scanning the image surface of the document C in the main scanning direction Dx while forwarding the document in the document forwarding direction (sub-scanning direction) Dy. Thus, the image reading means 14 serves to convert the optical density of each picture element of the image on the document into the corresponding electric signal data by use of the photoelectric conversion means 14f so as to effect image recognition or image reproduction. However, the structure and components of the image reading means 14 in this invention are not specifically limited, and any known measures for optical image reading may be adopted instead.

The document detecting means 16 includes a document detecting lever 16a actuated by the document being forwarded along the document setting surface 12, and a sensor 16b for sensing the movement of the document detecting lever 16a. Since it can be perceived from the movement of the document detecting lever 16a that the document is supplied, operations of switching on the system, feeding the document and/or reading the image on the document may begin in response to the movement of the document detecting lever 16a.

The upper frame 20, which extends horizontally above the document setting surface 12 of the base frame 10 from the side frame 30 so as to cover the document reading position X, incorporates means for transporting the document C placed on the document setting surface 12 in the forwarding direction Dy.

The document transporting means 22 comprises a rotating shaft Ax, and rotating feed rollers 22a and 22b held by the rotating shaft Ax and coming in press contact with the platen 14a of the image reading means 14. Although this embodiment employs two feed rollers as illustrated, the number of the feed rollers is not limited, and to put it at its most extreme, only one feed roller may suffice for this system.

Figure 5:
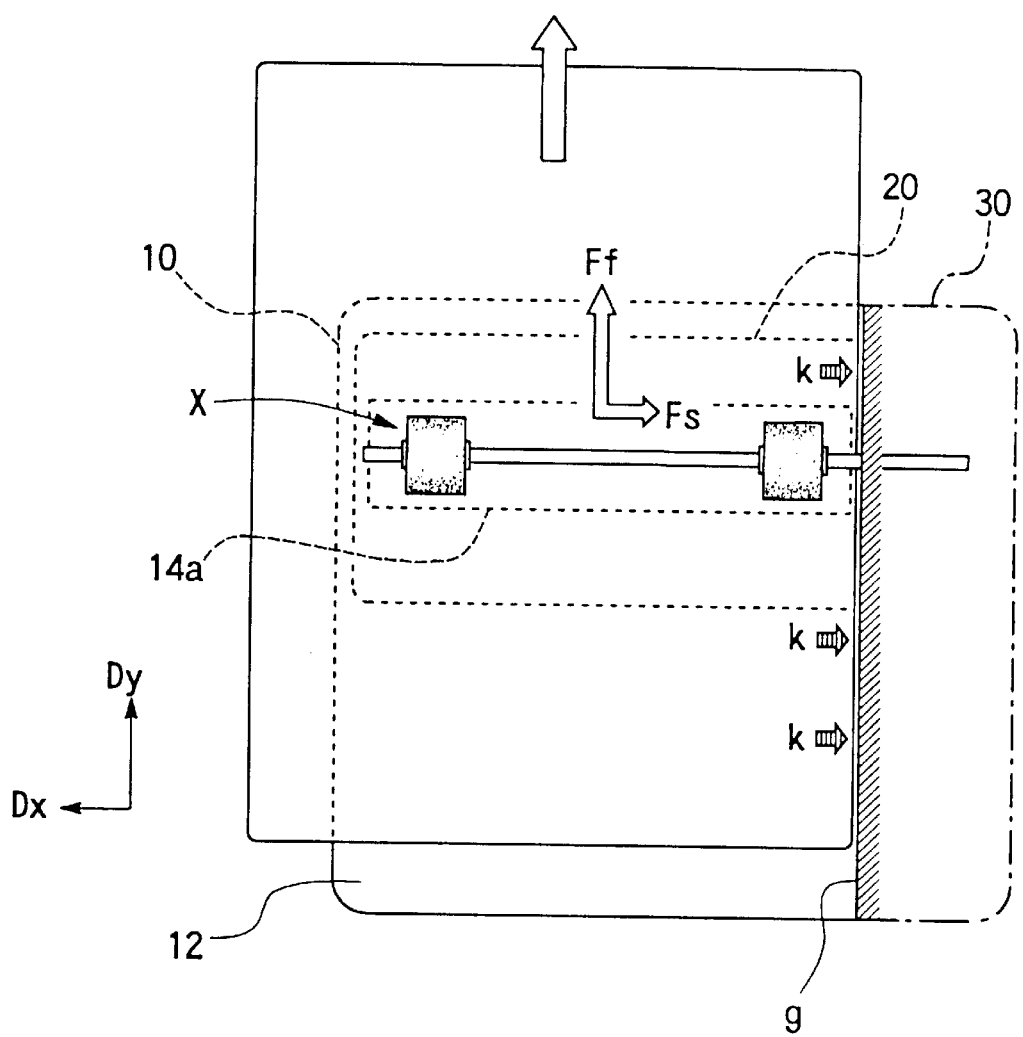
FIG. 5 is a schematic plane view explanatory of the principle of exerting a laterally urging force to a document in the device of the invention.

The document transporting means 22 has not only a function of moving the document C set on the document setting surface 12 in the proper forwarding direction Dy defined by the document guide surface g as touched upon above, but also a function of laterally urging the document being transported toward the document guide surface g. That is, as shown in FIG. 5 the document transporting means gives rise to a laterally urging action (arrow k) to bring one edge e of the document C advancing along the document setting surface into press contact with the guide surface g.

The aforenoted laterally urging action to force the document C toward the document guide surface can be executed by use of the feed rollers or a structure for supporting the feed rollers, which can be arranged in various manners, or any other mechanism for bringing the document C into press contact with the document guide surface g.

The document transporting means 22 is driven by a drive mechanism 24 including of a driving source 24a such as a motor, and means 24b for transmitting motive force generated by the driving source 24a to the rotating shaft Ax. These elements of the drive mechanism are assembled within the upper frame 30. An end gear 24c of the drive mechanism 24, which is mounted on the rotating shaft Ax of the document transporting means 22, is a bevel gear having a pitch cone angle determined according to the inclination angle of the rotating shaft Ax. The illustrated embodiment employs gears constituting the transmission means 24b, but instead, timing belts or other possible elements may be used as the transmission means.

Since the document passage P defined between the document setting surface and the upper frame 20 which incorporates the document transporting means 22 and supported in the state of a cantilever is open at its one side as noted above, the document C of any size can be dealt with regardless of the width W of the document.

By allowing the document C to be placed on the document setting surface 12 and inserted toward the document reading position X under the upper frame, the document detecting means 16 is actuated by the document thus inserted to drive the document transporting means 22, so that successively, the document on the document setting surface is automatically forwarded in the forwarding direction Dy and passed through the document reading position X. When passing the document through the document reading position X, the desired image processing is carried out while reading the image on the document by the image reading means 14.

To bring about the laterally urging action as mentioned above, the rotating shaft Ax supporting the feed rollers 22a and 22b may be inclined at a small angle of θ relative to the width direction Dx as shown in FIG. 2 to FIG. 6 by way of example, so that the feed roller 22b distant from the document guide surface g is placed ahead the feed roller 22a near the guide surface relative to the document forwarding direction.

Figure 6:
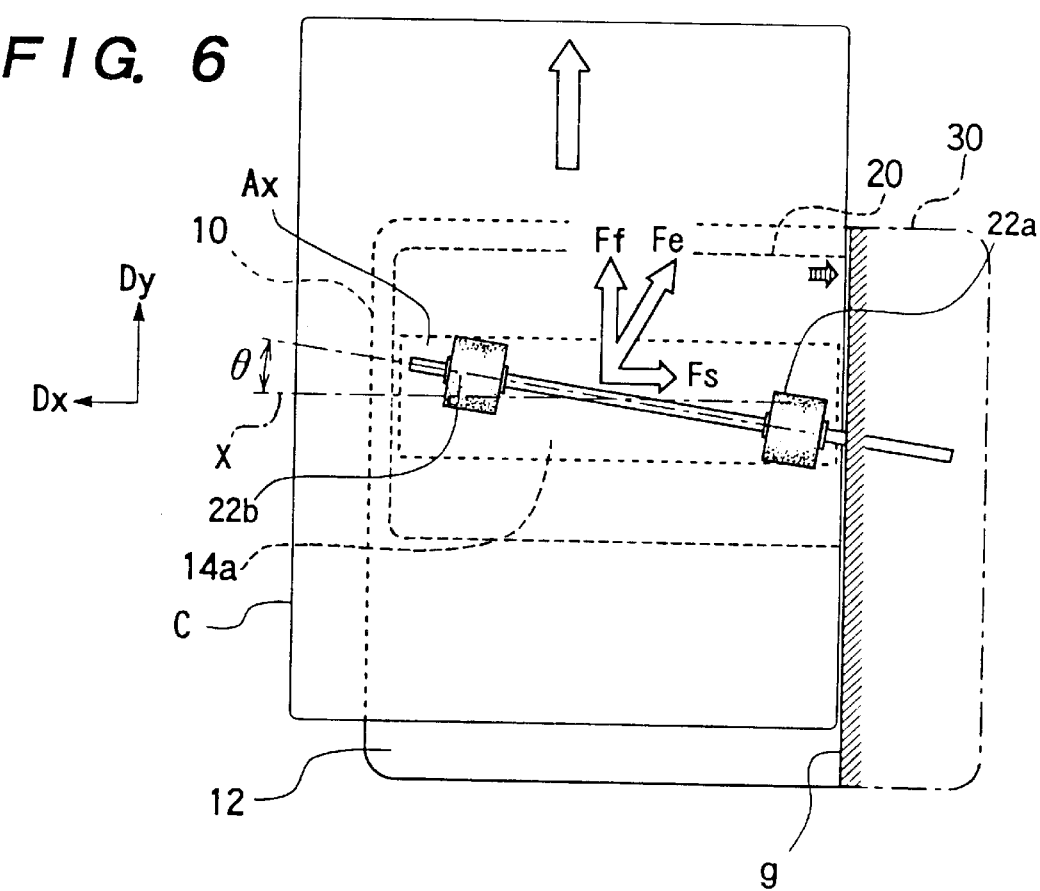
FIG. 6 is a schematic plane view of a document transporting means in one embodiment of the device according to the invention.
Figure 7:
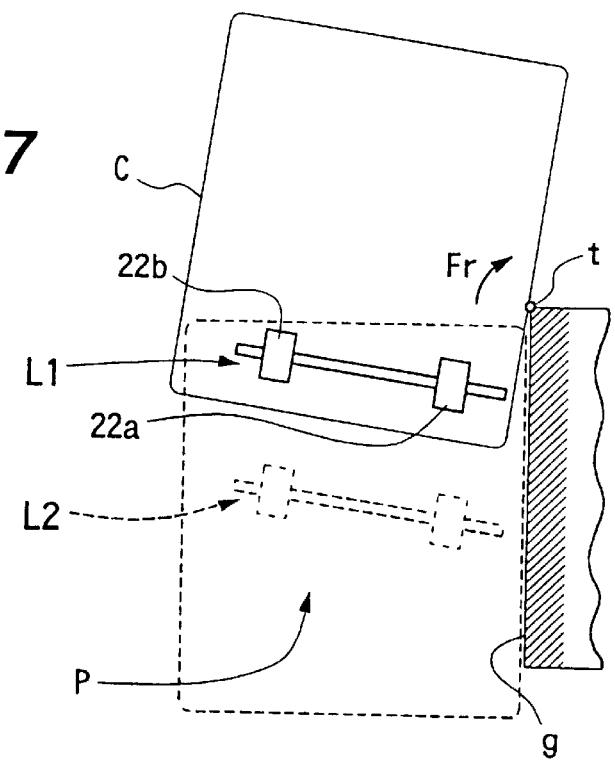
FIG. 7 is a plane view explanatory of the operating principle of the document transporting means of FIG. 6.

As conceptually illustrated in FIG. 6, the laterally urging action brought about by the document transporting means 22 is equivalent to a laterally urging force Fs acting in the main scanning direction Dx, which is a lateral vector of an effective feeding force Fe occurring perpendicular to the rotating shaft Ax inclined at the angle θ relative to the main scanning direction. Accordingly, the larger the inclination angle θ of the rotating shaft Ax is, the greater the contact pressure of the document relative to the document guide surface g is, thus to stabilize the document being moved along the document guide surface. However, an effective forwarding force Ff is decreased with increasing the inclination angle of the rotating shaft, consequently to reduce the efficiency of forwarding the document. Hence, the inclination angle θ of the rotating shaft Ax may preferably be small in practice.

Where the feed rollers 22a and 22b are placed on the front side of the document passage P (front zone L1 in FIG. 7), the document C will possibly experience a rotational moment Fr acting around the front end t of the guide surface g. So, the document transporting means may be designed so as to reduce the laterally urging force Fs to a minimum, or otherwise place the feed rollers on the middle portion (zone L2 in FIG. 7) or backward as much as possible.

Thus, the document is forwarded on the document passage P while being securely guided along the document guide surface g by the laterally urging action brought about by the document transporting means 22. Namely, the document C is stably forwarded in the proper forwarding direction by the specialized document transporting means 22 which imparts the laterally urging force Fs to the document C, without wobbling in the width direction (main scanning direction).

Figure 8:
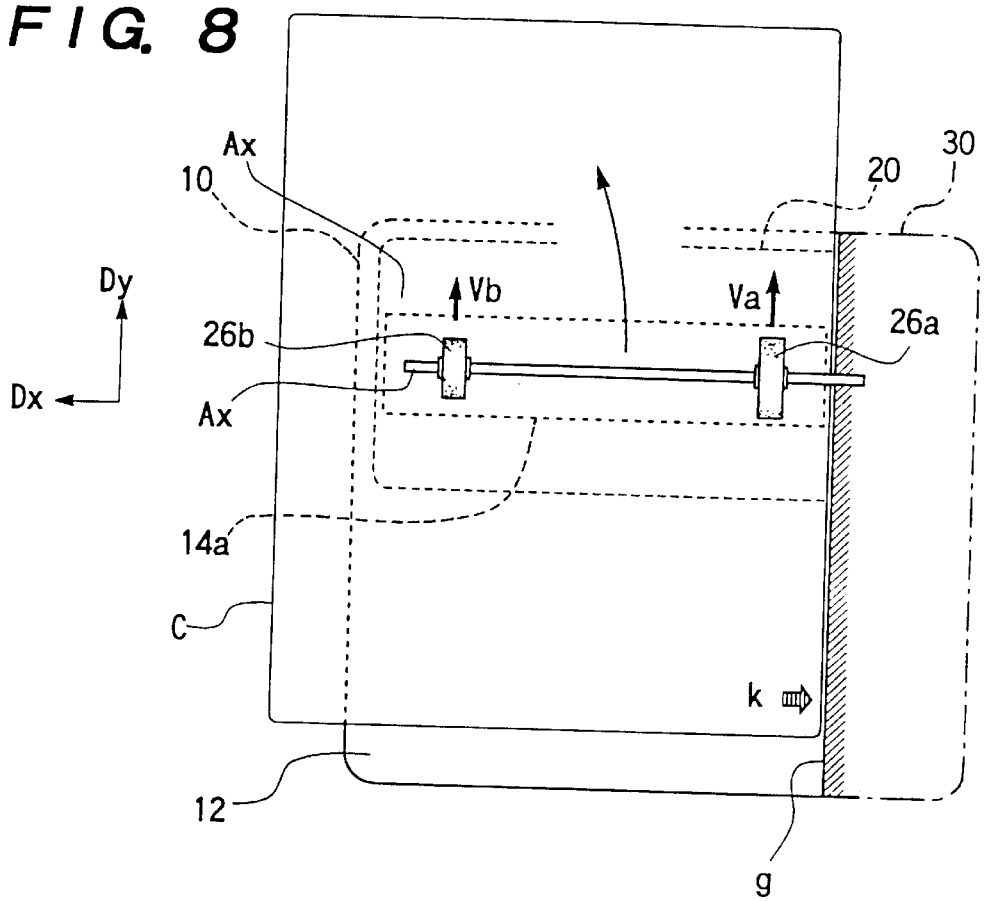
FIG. 8 is a schematic plane view showing another embodiment of this invention.

Instead of the arrangement in which the rotating shaft Ax supporting the feed rollers 22a and 22b is inclined to bring about the laterally urging force Fs as seen in the foregoing embodiment, there may be adopted an arrangement in which an outside feed roller 26b is smaller in diameter than an inside feed roller 26a as shown in FIG. 8 and both the inside and outside feed rollers are driven at the same rotational speed. The rotating shaft Ax in this embodiment is parallel to the main scanning direction Dx perpendicular to the document guide surface g.

According to this embodiment, a rotational moment R is caused due to the difference in forwarding speed between the inside feed roller 26a effecting the forwarding speed Va and the outside feed roller 26b effecting the forwarding speed Vb smaller than the forwarding speed effected by the inside roller, thereby causing turning of the document C around the document transporting means 22 so as to permit the leading end portion of the document to go away from the document guide surface g. As a result, the laterally urging action k is imparted to the document, to force the rear end portion of the document toward the document guide surface g, so that the document can be stably forwarded in the proper forwarding direction with a high accuracy without causing widthwise wobbling.

Figure 9:
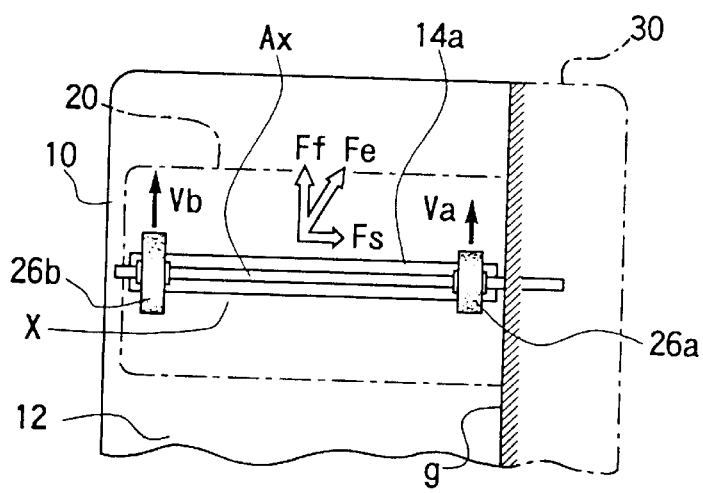
FIG. 9 is a plane view explanatory of the operating principle of the document transporting means of FIG. 8.

If it is possible to disposed the inside and outside feed rollers 26a and 26b around the middle portion of the document passage P relative to the forwarding direction as illustrated in FIG. 9, the relation in diameter between the inside and outside feed rollers may be reverse to that of FIG. 8. Namely, in such a case, the outside feed roller 26b may be larger in diameter than the inside feed roller 26a. In this embodiment, the effective feeding force Fe is directed to the document guide surface side, thereby bringing about the laterally urging force Fs for forcing the document toward the document guide surface g. Since the document guide surface g sustains the document, the document can be stably forwarded with the forwarding force Ff.

Figure 10:
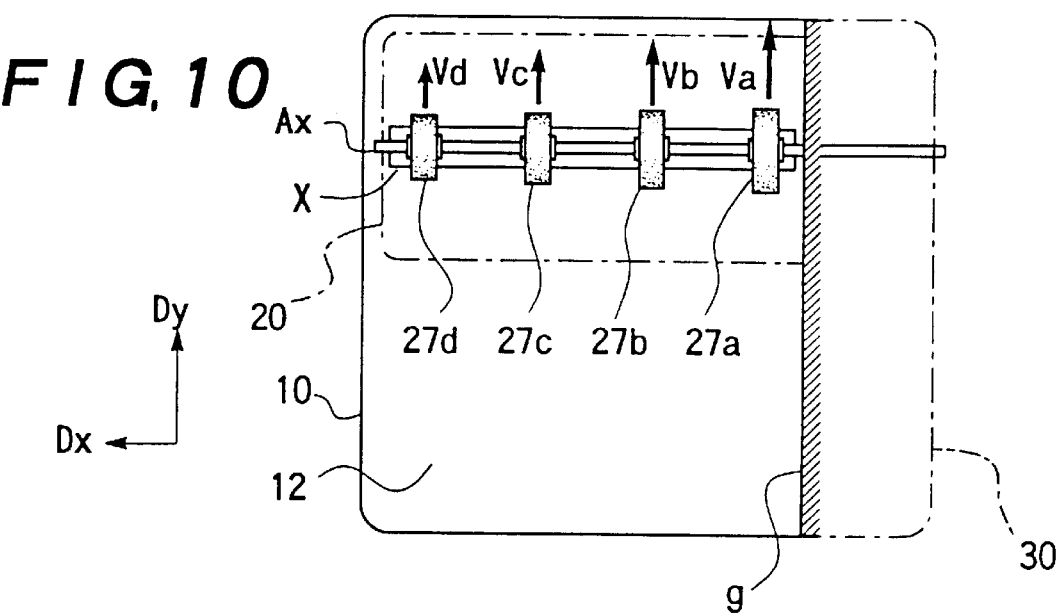
FIG. 10 is a schematic plane view showing still another embodiment of this invention.

In a modified embodiment shown in FIG. 10, the number of the feed rollers as shown in FIG. 8 is increased, but the structure of the image reading device is equivalent to the foregoing embodiments. That is, a plurality of feed rollers 27a–27d are mounted on the rotating shaft Ax parallel to the main scanning direction Dx. The feed rollers 27a–27d are decreased in diameter in the order from the innermost roller 27a close to the document guide surface to the outermost roller 27d distant from the document guide surface, so that the forwarding speeds Va–Vd effected by the respective feed rollers are stepwise decreased from the innermost roller 27a to the outermost roller 27d. Consequently, the document is forwarded in the direction receded from the document guide surface g, consequently to effect the laterally urging force for urging the rear end portion of the document toward the document guide surface g. Thus, the laterally urging force warrants stable and accurate forwarding of the document.

Figure 11:
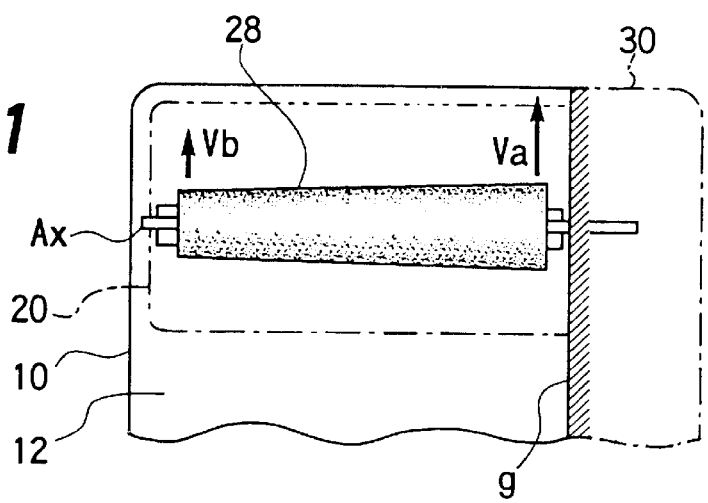
FIG. 11 is a schematic plane view showing yet another embodiment of this invention.

In a further embodiment shown in FIG. 11, a truncated conical feed roller 28 which is equivalent to the rollers 27a–27d in FIG. 10 is adopted. By varying the diameter of the roller 28 so that the inside part of the roller 28 close to the document guide surface g is made larger in diameter than the outside part of the roller 28 distant from the document guide surface, the rotational moment is brought about, so that the document is forwarded with the leading end portion of the document being moved in the direction receded from the document guide surface g and with the rear end portion being urged toward the document guide surface. As a result, the document can be stably forwarded with the resultantly produced laterally urging force for urging the document toward the document guide surface g.

Figure 12:
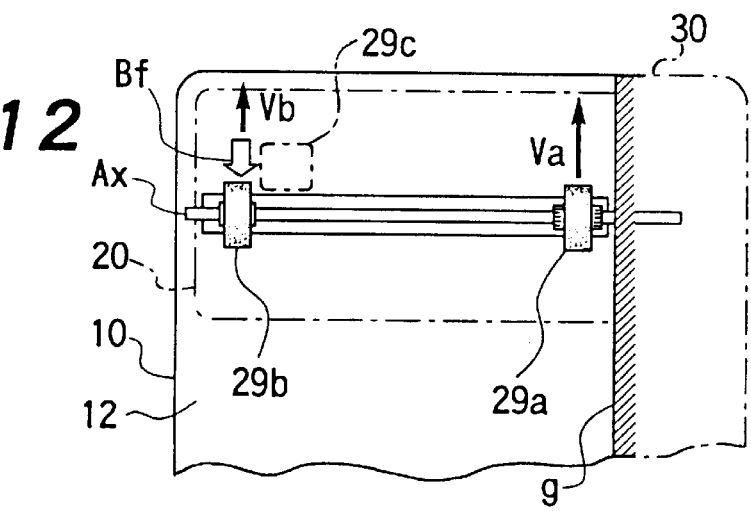
FIG. 12 is a schematic plane view showing a further embodiment of this invention.

In an embodiment of FIG. 12, feed rollers 29a and 29b having the same diameter are mounted on the rotating shaft Ax of the document transporting means 22 which is parallel to the main scanning direction Dx, and the outside feed roller 29b distant from the document guide surface g incurs a slight braking force Bf.

Thus, the outside feed roller 29b rotates slow at the speed Vb relative to the inside feed roller 29a rotating at the speed Va due to the braking force imparted to the outside feed roller, as a result of which the laterally urging force Fs is brought about to urge the rear end portion of the document toward the document guide surface g similarly to the embodiments mentioned above. Although this embodiment employs the two feed rollers 29a and 29b, three or more feed rollers may be used as a matter of course. In the case of using three or more feed rollers, the braking force Bf may be imparted to any of them placed on the side distant from the document guide surface g.

Instead of the structure in which the braking force Bf is imparted directly to the outside feed roller 29b, a braking member 29c such as a friction pad may be disposed distant from the document guide surface g, so that the document comes at its outside part distant from the document guide surface into contact with the braking member when being forwarded on the document setting surface 12.

As is apparent from the foregoing description, the image reading device according to the present invention makes it possible to automatically forward the document of any size including not only a small-sized name card but also a large-sized postcard or envelope to subject the document to image reading or image processing with regardless of the size of the document due to the cantilever-like structure which is formed of the base frame and upper frame so as to form the document passage being open at one side. Furthermore, the document forwarding means of the invention brings about the laterally urging force for urging the document toward the document guide surface, so that the document can be notably stably transported in the proper forwarding direction, thereby to reliably read the image on the document with a high accuracy. Thus, the image reading device of the invention having excellent performance of transporting the document and reading the image on the document can be constructed simply and compact and manufactured at a moderate cost.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. An optical reading device comprising:

a base frame having a document setting surface on which a document with an image to be read is placed and a document guide surface for defining a document forwarding direction is formed, image reading means for reading the image on the document being forwarded along said document guide surface on said document setting surface;

an upper frame having means for transporting the document along said document guide surface, said transporting means including at least two feed rollers having different diameters on both side ends to forward the document while pressing the document toward said document guide surface, said upper frame being supported above said document setting surface of said base frame astride a document passage is a cantilever state; and said two feed rollers being arranged substantially transverse to said forwarding direction over a document reading position of said image reading means with the roller closer to said guide surface having a smaller diameter.

2. The optical image reading device as claimed in claim 1, wherein said image reading means comprises a transparent platen flush with said document setting surface, a light source for illuminating the document passing on said platen, and a photoelectric conversion means for converting light reflected from said document into electric signal data.

3. The optical image reading device as claimed in claim 1, wherein a laterally urging force is brought about by said document transporting means and imparted to the document on said document setting surface to urge the document toward said document guide surface.

4. The optical image reading device as claimed in claim 3, wherein said document transporting means comprises a rotating shaft inclined relative to a direction perpendicular to said document guide surface, and at least one feed roller mounted on said rotating shaft.

5. The optical image reading device as claimed in claim 3, wherein said document transporting means comprises a rotating shaft perpendicular to said document guide surface, and a plurality of feed rollers mounted on said rotating shaft one of said feed rollers, which is distant from said document guide surface, incurring a braking force.

6. An optical reading device comprising:

a base frame having a document setting surface on which a document with an image to be read is placed and a document guide surface for defining a document forwarding direction is formed, and image reading means for reading the image on the document being forwarded along said document guide surface on said document setting surface, and an upper frame having means for transporting the document along said document guide surface while imparting a laterally urging force to the document to urge the document being forwarded along said document setting surface toward said document guide surface, said upper frame being supported above said document setting surface of said base frame astride a document passage in a cantilever state said means for transporting the document including two feed rollers arranged substantially transverse to said forwarding direction over a document reading position of said image reading means with the roller closer to said guide surface having a smaller diameter.

7. The optical image reading device as claimed in claim 6, wherein said document transporting means comprises a rotating shaft inclined relative to a direction perpendicular to said document guide surface, and at least one feed roller mounted on said rotating shaft.

8. The optical image reading device as claimed in claim 6, wherein said document transporting means comprises a rotating shaft perpendicular to said document guide surface, and a plurality of feed rollers mounted on said rotating shaft, one of said feed rollers, which is distant from said document guide surface, incurring a braking force.

9. An optical image reading device comprising:

a base frame having a document setting surface on which a document with an image to be read is placed and a document guide surface for defining a document forwarding direction is formed;

image reading means for reading the image on the document being forwarded along said document guide surface on said document setting surface; and an upper frame having means for transporting the document along said document guide surface, said transporting means including at least one feed roller mounted on a rotating shaft inclined relative to a direction perpendicular to said document guide surface to forward the document while pressing the document toward said document guide surface, said upper frame being supported above said document setting surface of said base frame astride a document passage in a cantilever state.

10. The optical image reading device as claimed in claim 9, wherein said image reading means comprises a transparent platen flush with said document setting surface, a light source for illuminating the document passing on said platen, and a photoelectric conversion means for converting light reflected from said document into electrical signal data.

11. An optical image reading device comprising:

a base frame having a document setting surface on which a document with an image to be read is placed and a document guide surface for defining a document forwarding direction is formed;

image reading means for reading the image on the document being forwarded along said document guide surface on said document setting surface;

an upper frame having means for transporting the document along said document guide surface;

a side frame for supporting said upper frame above said document setting surface of said base frame astride a document passage in a cantilever state; and document transporting means including a drive mechanism having a driving source mounted within said side frame.

12. An optical image reading device as claimed in claim 11 wherein said transparent platen is supported by a holder urged upwardly by a spring.

13. An optical image reading device as claimed in claim 11 wherein said transparent platen is supported by a holder urged toward said feed roller by a spring.

14. An optical image reading device as claimed in claim 11 further comprising a document detecting means actuated by a document being forwarded along said document setting surface.

15. An optical image reading device as claimed in claim 11 further comprising a document detecting means having a document detecting lever actuated by a document being forwarded along said document setting surface, and a sensor for sensing said document detecting lever.

16. An optical image reading device as claimed in claim 11 wherein said upper frame is supported above said based frame by a side frame, and said document transporting means is incorporated within said side frame.

* * * * *